(12) United States Patent
Madala

(10) Patent No.: US 11,269,877 B2
(45) Date of Patent: Mar. 8, 2022

(54) VISUALIZATION-ORIENTED TIME SERIES DATA AGGREGATION

(71) Applicant: SAP SE, Walldorf (DE)

(72) Inventor: Seshatalpasai Madala, Bangalore (IN)

(73) Assignee: SAP SE, Walldorf (DE)

( * ) Notice: Subject to any disclaimer, the term of this patent is extended or adjusted under 35 U.S.C. 154(b) by 452 days.

(21) Appl. No.: 15/630,489

(22) Filed: Jun. 22, 2017

(65) Prior Publication Data
US 2018/0373756 A1 Dec. 27, 2018

(51) Int. Cl.
*G06F 16/24* (2019.01)
*G06F 16/2453* (2019.01)
*G06F 16/248* (2019.01)
*G06F 16/2458* (2019.01)

(52) U.S. Cl.
CPC ...... *G06F 16/24534* (2019.01); *G06F 16/248* (2019.01); *G06F 16/2477* (2019.01)

(58) Field of Classification Search
CPC ............ G06F 16/24534; G06F 16/248; G06F 16/2477; G06F 17/24534; G06F 17/20
USPC ........................................................ 707/713
See application file for complete search history.

(56) References Cited

U.S. PATENT DOCUMENTS

2013/0212420 A1* 8/2013 Lawson ............. G05B 19/4185
713/400
2015/0347528 A1* 12/2015 Jugel ................. G06F 16/24535
707/759

OTHER PUBLICATIONS

Uwe Jugel, Zbigniew Jerzak (M4: A Visualization-Oriented Time Series Data Aggregation; Sep. 1-5, 2014, Hangzhou, China. Proceedings of the VLDB Endowment, vol. 7, No. 10 (Year: 2014).*
Jugel et al., "M4: A Visualization-Oriented Time Series Data Aggregation";. 40th International Conference on Very lage Data Bases, Sep. 1-5, 2014, Hangzhou, China; Proceedings of the VLDB Endowment, vol. 7, No. 10.

* cited by examiner

*Primary Examiner* — Hosain T Alam
*Assistant Examiner* — Tracy M McGhee
(74) *Attorney, Agent, or Firm* — Fish & Richardson P.C.

(57) ABSTRACT

Methods, systems, and computer-readable storage media for receiving a query that is coded into a computer-executed application that queries a database system, the query including a first portion that defines a number of groups that data is to be divided into, and a second portion that removes redundant values from a group, if any, processing, within the database system, the query to perform a plurality of computations within the database system, and produce a result set including a plurality of data groups, each data group having a minimum value and associated timestamp, and a maximum value and associated timestamp, and transmitting the result set to the application to provide one or more time series visualizations for display in a user interface.

20 Claims, 5 Drawing Sheets

VISUALIZATION-ORIENTED TIME SERIES DATA AGGREGATION

BACKGROUND

Visual analysis of high-volume, time series data is ubiquitous in many contexts including finance, banking, discrete manufacturing, and Internet-of-things (IoT) devices. Data can be stored in and accessed from database systems, such as relational database management systems (RDBMS) for visualization of high-volume time series data. Database systems, however, can have difficulty with hard latency requirements and high ingestion rates of interactive visualizations.

Traditional solutions for lowering the volume of time series data disregard the semantics of visualizations and result in visualization errors. In view of this, a visualization-oriented, time series data aggregation algorithm was introduced, which has been referred to as M4, and can be described as an aggregation-based time series dimensionality reduction technique that provides error-free visualizations at high data reduction rates. M4 can be implemented with aggregation-based dimensionality reduction at the query level in a visualization-driven, query rewriting system. Although M4 improved over then-existing solutions, opportunity exists to improve M4, particularly in the IoT context.

SUMMARY

Implementations of the present disclosure include computer-implemented methods for visualization-oriented, time series data aggregation. In some implementations, actions include receiving a query that is coded into a computer-executed application that queries a database system, the query including a first portion that defines a number of groups that data is to be divided into, and a second portion that removes redundant values from a group, if any, processing, within the database system, the query to perform a plurality of computations within the database system, and produce a result set including a plurality of data groups, each data group having a minimum value and associated timestamp, and a maximum value and associated timestamp, and transmitting the result set to the application to provide one or more time series visualizations for display in a user interface. Other implementations of this aspect include corresponding systems, apparatus, and computer programs, configured to perform the actions of the methods, encoded on computer storage devices.

These and other implementations can each optionally include one or more of the following features: the first portion includes a floor function and a least function, which are processed to provide the number of groups; the second portion removes a redundant value having an earlier timestamp from a group relative to a redundant value having a later timestamp; the query is processed based on a plurality of user-defined attributes including the number of groups, and a timestamp range defined based on a first timestamp and a second timestamp; the query includes a third portion that selectively includes a specified non-numeric value in the result set, in response to determining that the result set would otherwise not include the specified non-numeric value; the query includes a third portion including interpolation to provide data in the result set when no data exists in a requested time range; and the data includes machine-sensor data provided from one or more Internet-of-Things (IoT) devices.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to visualization-oriented, time series data aggregation. More particularly, implementations of the present disclosure are directed to improved querying to resolve disadvantages of traditional querying described herein. Implementations can include actions of receiving a query that is coded into a computer-executed application that queries a database system, the query including a first portion that defines a number of groups that data is to be divided into, and a second portion that removes redundant values from a group, if any, processing, within the database system, the query to perform a plurality of computations within the database system, and produce a result set including a plurality of data groups, each data group having a minimum value and associated timestamp, and a maximum value and associated timestamp, and transmitting the result set to the application to provide one or more time series visualizations for display in a user interface.

Implementations of the present disclosure are described herein with reference to an example data aggregation and visualization platform, which includes SAP IoT Application Enablement platform provided as part of the SAP Cloud Platform by SAP SE of Walldorf, Germany. The SAP IoT Application Enablement platform can be described as a selection of microservices and tools that enable customers to build Internet-of-Things (IoT) applications relatively quickly, securely and scalably. In some examples, the SAP IoT Application Enablement platform facilitates the digital representation (e.g., "digital twin") of real-world assets (e.g., physical objects, such as machines, products), and the persons and organizations that manufacture, monitor, control, or distribute these assets. It is contemplated, however, implementations of the present disclosure can be realized in any appropriate data aggregation and visualization platform.

Figure 1:
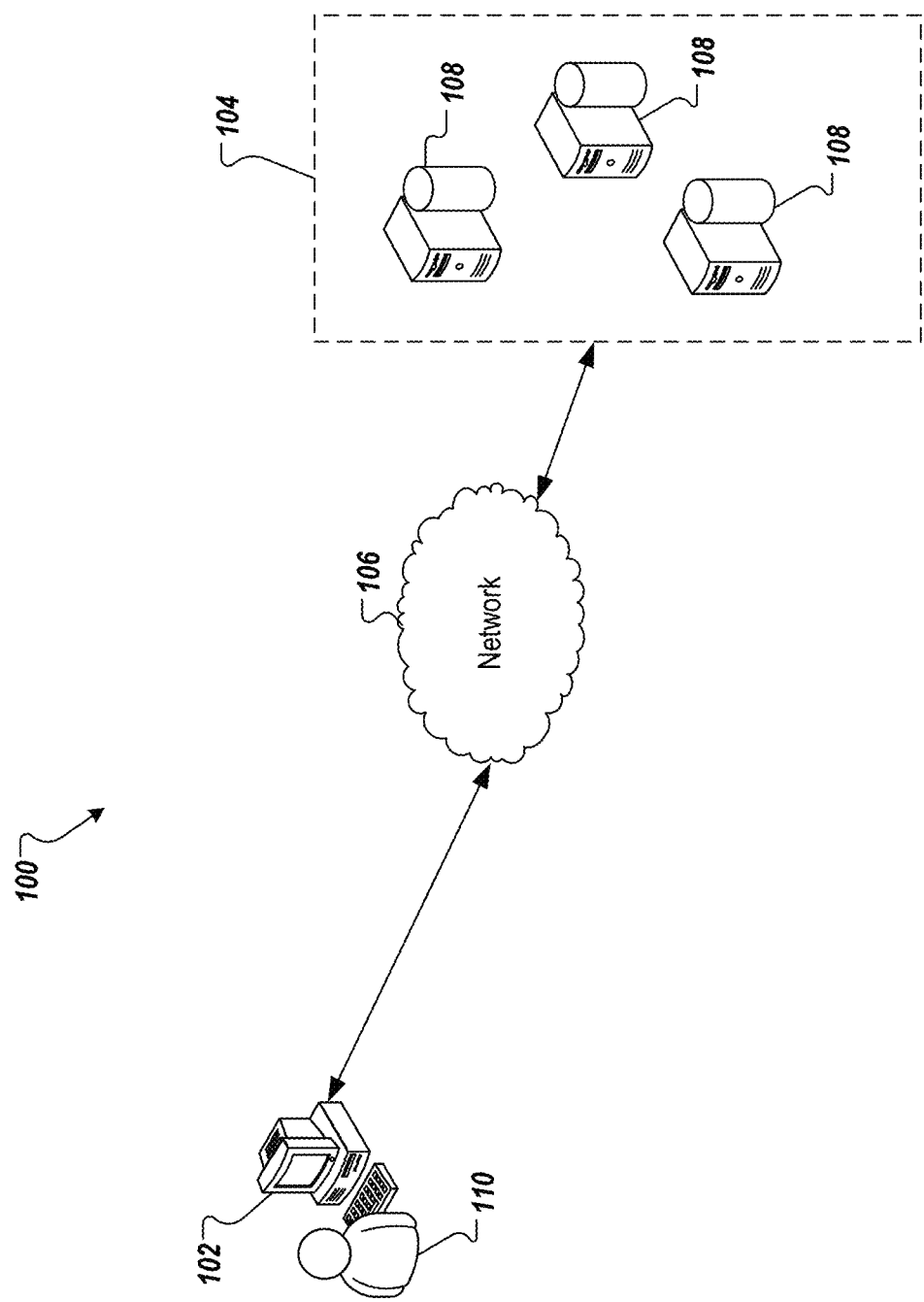
FIG. 1 depicts an example architecture that can be used to execute implementations of the present disclosure.

FIG. 1 depicts an example architecture 100 that can be used to execute implementations of the present disclosure. In the depicted example, the example architecture 100 includes one or more client devices 102, a server system 104 and a network 106. The server system 104 includes one or more server devices 108. In the depicted example, a user 110 interacts with the client device 102. In an example context, the user 110 can include a user, who interacts with an application that is hosted by the server system 104.

In some examples, the client device 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices (e.g., the client device 102) over the network 106.

In accordance with implementations of the present disclosure, the server system 104 can host a data aggregation and visualization platform, such as the SAP IoT Application Enablement platform (e.g., provided as one or more computer-executable programs executed by one or more computing devices). For example, data (e.g., asset data from IoT devices) can be provided to the server system, and the server system can process the data to provide aggregate data, and time series visualizations. For example, the server system 104 can send data and instructions to display time series visualization to the client device 102 over the network 106 for display to the user 110.

As introduced above, visual analysis of high-volume, time series data is ubiquitous in many contexts including finance, banking, discrete manufacturing, and IoT devices. Data can be stored in and accessed from database systems, such as relational database management systems (RDBMS) for visualization of high-volume time series data. Database systems, however, can have difficulty with hard latency requirements and high ingestion rates of interactive visualizations.

Traditional solutions for lowering the volume of time series data disregard the semantics of visualizations, and result in visualization errors. In view of this, a visualization-oriented, time series data aggregation algorithm was introduced, which has been referred to as M4, and can be described as an aggregation-based time series dimensionality reduction technique that provides error-free visualizations at high data reduction rates. M4 can be implemented with aggregation-based dimensionality reduction at the query level in a visualization-driven, query rewriting system. M4 is described in detail in a paper entitled "M4: A Visualization-Oriented Time Series Data Aggregation," authored by Uwe Jugel, Zbigniew Jerzak, Gregor Hackenbroich, and Volker Markl, and published in the Proceedings of the VLBD Endowment, Vol. 7, No. 10, pp. 797-808, on or about Jun. 1, 2014, the contents of which are expressly incorporated herein by reference in the entirety.

Although M4 improved over then-existing solutions, opportunity exists to improve M4, particularly in the IoT context. More specifically, in the IoT context, IoT devices generate relatively large amounts of data that is time stamped, and stored in a database system. Example IoT devices can include machine-mounted sensors (machine-sensors), which provide machine-sensor data. For example, an asset, such as a train, can have tens, hundreds, if not thousands, of machine sensors, each of which can generate relatively significant amounts of machine-sensor data. In some examples, machine-sensor data can be of various types. Example types include data that changes very frequently (e.g., at a frequency of seconds, or microseconds), and data that changes less frequently (e.g., minutes, hours, days). Frequently changing data can include data having numeric values (e.g., temperature data, pressure data). Less frequently changing data can include data having Boolean values (e.g., on/off status of a machine).

In handling machine-sensor data, one issue with M4 includes the number of divisions that result when dividing timestamp-based machine sensor data. For example, in dividing the timestamp-based machine sensor data into N divisions using M4, the result actually includes N+1 divisions. This results in divisions that are not equal, and the data in the N+1 division not being included in M4 computations. Further, the M4 computation fetches the minimum and maximum value for each division. However, M4 does not account for cases where multiple records with the same minimum value or maximum value exist, and/or may not be accurate when the data is used to plot against timestamp in a chart representation. Also, the M4 computation fetches the minimum maximum, first and last value for each division irrespective of their uniqueness. Further, M4 divides time ranges into N number of divisions irrespective of the data existence, which can lead to inaccurate results, particularly when the data is not evenly distributed. Continuing, M4 does not account for the different types of data, and the M4 computations for timestamp-based machine sensor data does not apply any kind of artificial intelligence (AI) and/or predictive analytics during the data reduction, particularly in instances where there is no data for the requested time range.

In view of the above context, implementations of the present disclosure provide improvements to visualization-oriented, time series data aggregation, M4 in particular. More specifically, and as described in further detail herein, implementations of the present disclosure provide for improved computation at the persistency layer of a data aggregation and time series platform in response to an M4 query to an underlying database system.

Figure 2:
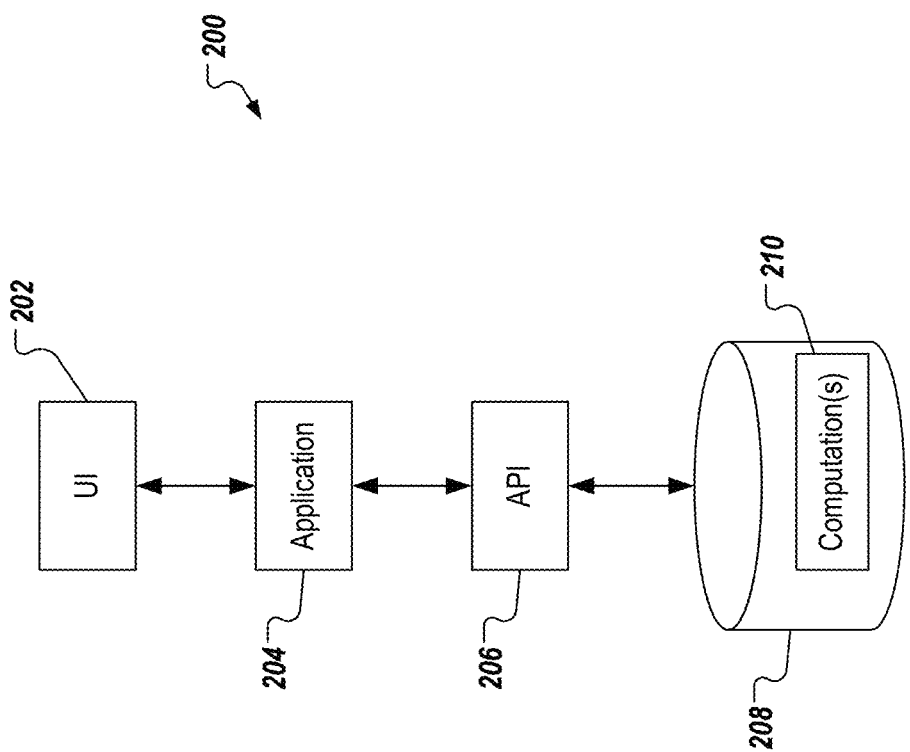
FIG. 2 depicts an example conceptual architecture in accordance with implementations of the present disclosure.

FIG. 2 depicts an example conceptual architecture 200 in accordance with implementations of the present disclosure. The example conceptual architecture 200 is generally representative of the SAP IoT Application Enablement platform introduced above, and depicts data flow between a presentation layer, and a persistency layer. The example conceptual architecture of FIG. 2 includes a user interface (UI) 202, an application 204, an application program interface (API) 206, and a database system 208.

Figure 3:
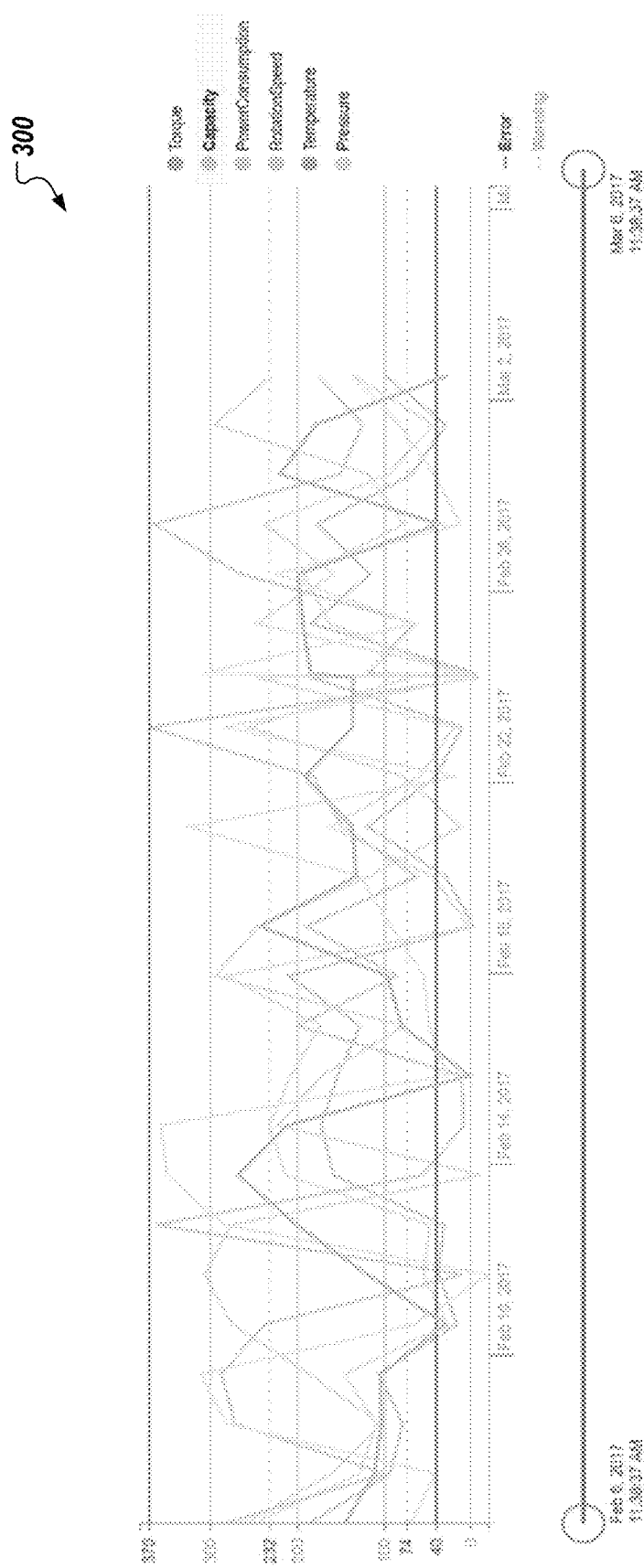
FIG. 3 depicts an example time-series visualization in accordance with implementations of the present disclosure.

In some examples, the UI 202 is displayed in a web browser executing on a client-side device (e.g., the client device 102 of FIG. 1), and can display time series visualizations, such as that discussed herein with reference to FIG. 3. In some examples, the application 204 is provided as one or more computer-executable programs executed by one or more computing devices (e.g., the client device 102, the server device 108 of FIG. 1). In some examples, the application 204 submits queries to, and receives data from the database system 208 (e.g., requesting time series data) through the API 206. In some examples, the API 206 is provided as a representational state transfer (REST) API. In accordance with implementations of the present disclosure, the application 204 queries the database system 208 using an M4 query, as described herein. In some examples, the query is directly coded within the code of the application. That is, for example, the user does not construct a query, but instead inputs parameters (e.g., into the UI 202), which parameters are used in processing of the query. In response to the M4 query, the database system 208 executes one or more computations 210 to provide data responsive to the query.

The database system 208 can include any appropriate database system. An example database system includes the in-memory SAP HANA database system provided by SAP SE of Walldorf, Germany. In some examples, a database can be provided as an in-memory database. In some examples, an in-memory database is a database management system that uses main memory for data storage. In some examples, main memory includes random access memory (RAM) that communicates with one or more processors (e.g., central processing units (CPUs)), over a memory bus. An-memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage databases.

FIG. 3 depicts an example time-series visualization 300 in accordance with implementations of the present disclosure. The example time series visualization 300 of FIG. 3 depicts multiple time series, each corresponding to a respective attribute of an asset. In the depicted example, example attributes are provided as torque, capacity, power consumption, rotation speed, temperature, and pressure. In some examples, data underlying a time series is provided as data generated by an IoT sensor (e.g., machine-sensor data). In FIG. 3, such data can include, for example, torque, rotation speed, temperature, and pressure. In some examples, data underlying a time series can include calculations determined based on data generated by an IoT sensor. In FIG. 3, such data can include, for example, capacity, and power consumption. The example time series visualization 300 of FIG. 3 can be displayed in a UI, such as the UI 202 of FIG. 2, in response to a query to the database system 208. Each time-series in the example time-series visualization 300 is based on data returned by the computation 210. Implementations of the present disclosure provide improvements to enhance accuracy of the time-series visualization 300.

Implementations of the present disclosure provide for improved querying of and computation within a database system (e.g., the database system 208 of FIG. 2). A traditional M4 query can be provided as follows:

---
Query 1: Traditional Query
---
SELECT timestamp,value FROM TIMESERIES_TABLE
   INNER JOIN
   (SELECT round($w*(timestamp−$t1)/($t2−$t1)) as k, min(value) as
     v_min, max(value) as v_max, min(timestamp) as t_min,
     max(timestamp) as t_max FROM TIMESERIES_TABLE
     GROUP BY k) as QA
   ON k = round($w*(timestamp−$t1)/($t2−$t1))
   AND (value = v_min OR value = v_max OR timestamp = t_min
     OR timestamp = t_max)
---

This traditional M4 query, however, has disadvantages. For example, $w is the number of divisions (N), in which the timestamp-based data is to be split into. The above query, however, splits the data into $w+1 divisions, and the last record (which falls in the N+1 group) is always returned. Further, the above query fetches any random timestamp for the minimum value, and the maximum value in a division, if there are multiple values with the same minimum or maximum. Also, within a division, if the combination of timestamp and value has duplicate values, then such duplicates are not eliminated.

In view of this, implementations of the present disclosure provide an improved query to retrieve more accurate data in a more efficient manner. An improved query of the present disclosure can be provided as:

---
Query 2: Improved Query
---
SELECT DISTINCT timestamp, value
   FROM (
   SELECT DISTINCT Timestamp as timestamp, max(Value) As value FROM
     TIMESERIES_TABLE AS Q
   INNER JOIN (SELECT K, min(Value) as MIV, max(Value) AS MXV,
     Min(Timestamp) AS MIT, max(Timestamp) AS MXT
   FROM (SELECT CASE WHEN K = $w THEN $w−1 ELSE K END AS K,
     Timestamp, Value
   FROM (SELECT floor($w*nano100_between($t1,Timestamp)/
     nano100_between($t1,$t2)) AS K, Timestamp, Value FROM
     TIMESERIES_TABLE WHERE Timestamp BETWEEN $t1 AND $t2))GROUP BY
     K) AS QA

| Query 2: Improved Query |
| --- |
| ON QA.K = least(floor(4*nano100_between($t1,Timestamp)/<br>    nano100_between($t1,$t2)), $w−1) AND (Q.Timestamp = MIT OR<br>    Q.Timestamp = MXT) WHERE Q.Timestamp BETWEEN $t1 AND $t2 GROUP<br>    BY QA.K, Q.Timestamp<br>UNION ALL<br>SELECT DISTINCT MAX(Timestamp) as timestamp, Value As value FROM<br>    TIMESERIES_TABLE AS Q<br>INNER JOIN (SELECT K, min(Value) as MIV, max(Value) AS MXV,<br>    Min(Timestamp) AS MIT, max(Timestamp) AS MXT<br>FROM (SELECT CASE WHEN K = $w THEN $w−1 ELSE K END AS K,<br>    Timestamp, Value<br>FROM (SELECT<br>    floor(4*nano100_between($t1,Timestamp)/nano100_between($t1,$t2<br>    )) AS K, Timestamp, Value FROM<br>TIMESERIES_TABLE WHERE Timestamp BETWEEN $t1 AND $t2)) GROUP BY<br>    K) AS QA<br>ON QA.K = least(floor(4*nano100_between($t1,Timestamp)/<br>    nano100_between($t1,$t2 )),$w−1) AND<br>Q.Value = MIV OR Q.Value = MXV) WHERE Q.Timestamp BETWEEN $t1 AND<br>    $t2 GROUP BY QA.K, Q.Value<br>) ORDER BY timestamp; |

As a result of the above, improved query (Query 2), divisions are done using the formula floor($w*nano100_between($t1,Timestamp)/nano100_between($t1,$t2)), and additional logic is added to move the records in the $N+1^{th}$ group into the $N^{th}$ group. In this manner, the improved query ensures that only N number of divisions are provided. Further, by splitting the query to get minimum value and maximum value, as well as value at minimum timestamp and value at maximum timestamp, the improved query ensures that, for minimum and maximum values, the latest timestamp is returned, instead of any random timestamp. Also, using DISTINCT, duplicate values are filtered and only the distinct values are returned.

In general, the improved queries described herein include a first portion, and a second portion. The first portion begins with the SELECT DISTINCT Timestamp . . . argument (e.g., line 3 of Query 2, above), and the second portion begins with the SELECT DISTINCT MAX (Timestamp) . . . argument (e.g., line 18 of Query 2, above). In accordance with implementations of the present disclosure, the first portion includes a floor function, and a least function. In some examples, the floor function in hand with the least function and the variable $w−1 results in the data being divided into the appropriate number of groups. That is, if the number of groups is to be N, the first portion ensures that N groups are provided, instead of the N+1 groups that would have resulted from the traditional query (e.g., Query 1, above) uses a round function, which results in disadvantages described herein). In accordance with implementations of the present disclosure, the second portion provides that, in the case of duplicate values within a timestamp range, the value with the most recent timestamp is returned. For example, if a group includes two minimum/maximum values that are the same, the minimum/maximum value of with the most recent timestamp is used (e.g., the minimum/maximum value with the earlier timestamp is removed from the group).

In some examples, the traditional query uses the given time range $t1 and $t2 directly in the query. In contrast, the improved query can be modified to first perform the following example argument:

| Query Modification |
| --- |
| SELECT Max(Timestamp) as $t1_new, Min(Timestamp) as $t2_new<br>    FROM TIMESERIES_TABLE WHERE Timestamp BETWEEN<br>    $t1 and $t2; |

For example, the example query modification can be appended to the bottom of the improved query (Query 2, above) to process the data returned by the first portion and the second portion. The advantage of this can be illustrated by way of an example, which considers the below example table of timestamps and respective values:

| Timestamp | Value |
| --- | --- |
| 01-01-2016 10:00 AM | 10 |
| 01-01-2016 10:10 AM | 3 |
| 01-01-2016 10:20 AM | 6 |
| 01-01-2016 10:30 AM | 7 |
| 01-01-2016 10:40 AM | 5 |
| 01-01-2016 10:50 AM | 15 |
| 01-01-2016 11:00 AM | 9 |
| 01-01-2016 11:10 AM | 12 |
| 01-01-2016 11:20 AM | 14 |
| 01-01-2016 11:30 AM | 16 |
| 01-01-2016 11:40 AM | 21 |
| 01-01-2016 11:50 PM | 7 |
| 01-01-2016 12:00 PM | 8 |
| 01-01-2016 12:10 PM | 2 |
| 01-01-2016 12:20 PM | 16 |
| 01-01-2016 12:30 PM | 13 |

In this example, it can be determined that the number of divisions (N) is three (e.g., $w=3), $t1=01-01-2016 09:00 AM, and $t2=01-01-2016 12:00 PM. The following example time intervals and values for the three divisions resulting from the traditional query would be:

- 01-01-2016 09:00 AM-01-01-2016 10:00 AM (Number of records in this range from the above table: 1), Values (10);
- 01-01-2016 10:01 AM-01-01-2016 11:00 AM (Number of records in this range from the above table: 6), Values (3, 15, 3, 9); and
- 01-01-2016 11:01 AM-01-01-2016 12:00 PM (Number of records in this range from the above table: 6), Values (7, 21, 9, 21).

Although a total of nine values are returned, there are only seven distinct values. In contrast, the following example time intervals and values for the three divisions resulting from the improved query would be:

01-01-2016 10:00 AM-01-01-2016 10:40 AM (Number of records in this range from the above table: 5), Values (10, 3, 7);

01-01-2016 10:41 AM-01-01-2016 11:20 AM (Number of records in this range from the above table: 4), Values (15, 14, 9); and 01-01-2016 11:21 AM-01-01-2016 12:00 PM (Number of records in this range from the above table: 4), Values (7, 21, 16)

As seen, a total of nine, distinct values are returned. Accordingly, the improved query not only provides a better representation of the data, but also eliminates duplicate values.

As noted above, the traditional query does not account for data type of the values (e.g., numeric, Boolean) that are stored against the timestamps. In contrast, a modification to the improved query provides improvements for Boolean type of data, which generally reflects some kind of status, and is sent as a measurement only when there is a change in the state (e.g., ON, NULL). An example query in accordance with the present disclosure can be provided as:

| Query 3: Modified Improved Query |
| --- |
| SELECT DISTINCT timestamp, value<br>    FROM (<br>    SELECT DISTINCT Timestamp as timestamp, max(Value) As value FROM<br>        TIMESERIES_TABLE AS Q<br>    INNER JOIN (SELECT K, min(Value) as MIV, max(Value) AS MXV,<br>        Min(Timestamp) AS MIT, max(Timestamp) AS MXT FROM (SELECT CASE<br>        WHEN K = $w THEN $w−1 ELSE K END AS K, Timestamp, Value<br>    FROM (SELECT floor($w*nano100_between($t1,Timestamp)/<br>        nano100_between($t1,$t2)) AS K, Timestamp, Value FROM<br>        TIMESERIES_TABLE WHERE Timestamp BETWEEN $t1 AND $t2)) GROUP<br>        BY K) AS QA<br>    ON QA.K =<br>        least(floor(4*nano100_between($t1,Timestamp)/nano100_between($<br>        t1,$t2)), $w−1) AND (Q.Timestamp = MIT OR Q.Timestamp = MXT)<br>        WHERE Q.Timestamp BETWEEN $t1 AND $t2 GROUP BY QA.K,<br>        Q.Timestamp<br>    UNION ALL<br>    SELECT DISTINCT MAX(Timestamp) as timestamp, Value As value FROM<br>        TIMESERIES_TABLE AS Q<br>    INNER JOIN (SELECT K, min(Value) as MIV, max(Value) AS MXV,<br>        Min(Timestamp) AS MIT, max(Timestamp) AS MXT FROM (SELECT CASE<br>        WHEN K = $w THEN $w−1 ELSE K END AS K, Timestamp, Value<br>    FROM (SELECT floor(4*nano100_between($t1,Timestamp)/<br>        nano100_between($t1,$t2)) AS K, Timestamp, Value FROM<br>        TIMESERIES_TABLE WHERE Timestamp BETWEEN $t1 AND $t2)) GROUP<br>        BY K) AS QA<br>    ON QA.K = least(floor(4*nano100_between($t1,Timestamp)/<br>        nano100_between($t1,$t2 )),$w−1) AND Q.Value = MIV OR Q.Value =<br>        MXV) WHERE Q.Timestamp BETWEEN $t1 AND $t2 GROUP BY QA.K,<br>        Q.Value<br>    UNION ALL<br>    (SELECT TOP 1 $t1 as timestamp, Value as value FROM<br>        TIMESERIES_TABLE AS Q WHERE Timestamp <= $t1 and Value IS NOT<br>        NULL ORDER BY Timestamp DESC)<br>    ) ORDER BY timestamp; |

Improvements achieved by the above, improved query (Query 3) can be illustrated by way of example. In the example, an asset can include a part that has either an ON status, or an OFF status. Based on other factors this status changes, but at lower frequency as compared to other data values (e.g., numeric). In this case, the database system may have numerous NULL values, and, when a query is made for a time range, there is a high chance that only the NULL values are returned, which does not actually reflect the current status of the machine. The following example data set can be considered:

| Timestamp | Pressure | Status |
| --- | --- | --- |
| 01-01-2016 10:00 AM | 10 | ON |
| 01-01-2016 10:10 AM | 3 | NULL |
| 01-01-2016 10:20 AM | 6 | NULL |
| 01-01-2016 10:30 AM | 7 | NULL |

The following example input criteria can be considered: the number of divisions (N) is three ($w=3), $t1=01-01-2016 10:10 AM, and $t2=01-01-2016 10:30 PM. The following example time intervals and values for the three divisions resulting from the traditional query would be:

01-01-2016 10:00 AM-01-01-2016 10:10 AM (Number of records in this range from the above table: 1), Values (NULL);

01-01-2016 10:11 AM-01-01-2016 10:20 AM (Number of records in this range from the above table: 1), Values (NULL); and 01-01-2016 10:21 AM-01-01-2016 10:30 AM (Number of records in this range from the above table: 1), Values (NULL)

In this example, a total three NULL values are returned, which does not mean anything to the user. In contrast, the time intervals and values resulting from the improved query would include an earlier value from the timestamp that is <01-01-2016 10:10 AM. Only one value is returned for the timestamp 01-01-2016 10:10 AM, and the value at the timestamp 01-01-2016 10:00 AM is actually picked up and shown against the requested timestamp. Hence, it will be 01-01-2016 10:10 AM.

As noted above, the traditional query does not perform any additional computation when there is no data in the requested time range. In contrast, a modification of the improved query of the present disclosure can perform additional computations for different scenarios, in each of which there is no data in the requested time range. Example scenarios and corresponding computations include:

| Scenarios | Computations |
| --- | --- |
| No data exists in the requested time range, but data exists in the earlier time, and but not later. | Latest value from an earlier timestamp to be shown against the start timestamp ($t1). |
| No data exists in the requested time range, but data exists in the earlier time as well as in the later time for a Boolean value, | For the Boolean values, retrieve the latest value from the earlier timestamp and show it against both start and end timestamp ($t1 and $t2) |
| No data exists in the requested time range, but data exists in the earlier time as well as in the later time for a Numeric value. | For the Numeric values, perform an interpolation based on the latest value from the earlier timestamp and the earliest value from the later timestamp. |

An example query in accordance with the present disclosure can be provided as:

Improvements achieved by the above, improved query (Query 4) can be illustrated by way of example, using the following example data set:

| Timestamp | Pressure | Status |
| --- | --- | --- |
| 01-01-2016 09:00 AM | 5 | NULL |
| 01-01-2016 09:10 AM | 10 | ON |
| 01-01-2016 09:20 AM | 15 | NULL |
| 01-01-2016 09:30 AM | 20 | NULL |
| 01-01-2016 11:00 AM | 40 | OFF |
| 01-01-2016 11:10 AM | 45 | NULL |
| 01-01-2016 11:20 AM | 50 | NULL |

Query 4: Modified Improved Query

```
SELECT DISTINCT timestamp, value
    FROM (
    SELECT DISTINCT Timestamp as timestamp, max(Value) As value FROM
        TIMESERIES_TABLE AS Q
    INNER JOIN (SELECT K, min(Value) as MIV, max(Value) AS MXV,
        Min(Timestamp) MIT, max(Timestamp) AS MXT FROM (SELECT CASE
        WHEN K = $w THEN $w-1 ELSE K END AS K, Timestamp, Value
    FROM (SELECT
        floor($w*nano100_between($t1,Timestamp)/nano100_between($t1,$t
        2)) AS K, Timestamp, Value FROM TIMESERIES_TABLE WHERE
        Timestamp BETWEEN $t1 AND $t2)) GROUP BY K) AS QA
    ON QA.K =
        least(floor(4*nano100_between($t1,Timestamp)/nano100_between($
        t1,$t2)), $w-1) AND (Q.Timestamp = MIT OR
    Q.Timestamp = MXT) WHERE Q.Timestamp BETWEEN $t1 AND $t2 GROUP BY
        QA.K, Q.Timestamp
    UNION ALL
    SELECT DISTINCT MAX(Timestamp) as timestamp, Value As value FROM
        TIMESERIES_TABLE AS Q
    INNER JOIN (SELECT K, min(Value) as MIV, max(Value) AS MXV,
        Min(Timestamp) MIT, max(Timestamp) AS MXT FROM (SELECT CASE
        WHEN K = $w THEN $w-1 ELSE K END AS K, Timestamp, Value
    FROM (SELECT
        floor(4*nano100_between($t1,Timestamp)/nano100_between($t1,$t2
        )) AS K, Timestamp, Value FROM
    TIMESERIES_TABLE WHERE Timestamp BETWEEN $t1 AND $t2)) GROUP BY
        K) AS QA
    ON QA.K = least(
        floor(4*nano100_between($t1,Timestamp)/nano100_between($t1,$t2
        )),$w-1) AND
    Q.Value = MIV OR Q.Value = MXV) WHERE Q.Timestamp BETWEEN $t1
        AND $t2 GROUP BY QA.K, Q.Value UNION ALL
    (SELECT TOP 1 $t1 as timestamp, (Value * Interpolation_Factor)
        as value FROM TIMESERIES_TABLE AS Q WHERE
    Timestamp <= $t1 and Value IS NOT NULL ORDER BY Timestamp DESC))
    ORDER BY timestamp;
```

In a first example scenario (e.g., first scenario in the table above), an example time range can include 01-01-2016 11:30 AM to 01-01-2016 11:50 AM, for which there is no data. The improved query of the present disclosure will return the example result: 01-01-2016 10:00 AM, Pressure—50, Status OFF. In a second example scenario (e.g., second scenario in the table above), an example time range can include 01-01-2016 10:00 AM to 01-01-2016 10:30 AM, within which no data exists, but data does exist in the earlier time as well as in the later time. For status, the improved query of the present disclosure will provide a value of ON at 01-01-2016 10:00 AM and 01-01-2016 10:30 AM. In a third example scenario (e.g., third scenario in the table above), an example time range can include 01-01-2016 10:00 AM to 01-01-2016 10:30 AM, within which no data exists, but data exists in previous and later time ranges. For pressure, the improved query of the present disclosure will provide an interpolation of the value at 01-01-2016 10:00 AM based on values at 01-01-2016 9:30 AM and 01-01-2016 11:00 AM, and an interpolation of the value at 01-01-2016 10:30 AM based on values at 01-01-2016 9:30 AM and 01-01-2016 11:00 AM.

Figure 4:
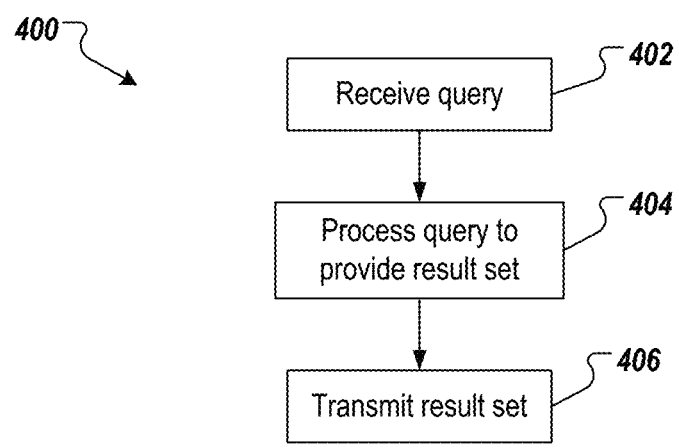
FIG. 4 depicts an example process that can be executed in accordance with implementations of the present disclosure.

FIG. 4 depicts an example process 400 that can be executed in accordance with implementations of the present disclosure. In some examples, the example process 400 can be provided by one or more computer-executable programs executed using one or more computing devices. The example process 400 can be performed to provide data for time series visualizations based on stored machine-sensor data.

A query is received (402). For example, an improved query of the present disclosure is received by a database system (e.g., the database system 208 of FIG. 2). In some examples, the query is coded into a computer-executed application (e.g., the application 204), and includes a plurality of attributes, which include a number of groups data is to be divided into, and a time range within which data is to be selected from. In accordance with implementations of the present disclosure, the query includes a first portion that defines a number of groups that data is to be divided into, and a second portion that removes redundant values from a group, if any. The query is processed (404). In some examples, the query is processed by the database system to perform a plurality of computations (e.g., the computation(s) 210) within the database system, and produce a result set. The result set includes a plurality of data groups, each data group having a minimum value and associated timestamp, and a maximum value and associated timestamp. The result set is transmitted (406). In some examples, the result set is transmitted by the database system to the application to provide one or more time series visualizations for display in a user interface (e.g., FIG. 3).

Implementations of the present disclosure provide one or more of the following example advantages. An example advantage includes a correct number of divisions (e.g., N divisions instead of N+1 divisions) of the time-stamped machine sensor data. In this manner, an accurate sampling of the data is retrieved to improve the accuracy of the resulting time-series. Another example advantage includes addressing redundant minimum, and/or maximum values within a division by selecting the most recent of the redundant values, again improving accuracy of the retrieved data. Another example advantage includes distinguishing between types of the machine-sensor data to further improve accuracy of the retrieved data. Still another example advantage includes accounting for scenarios, in which data is absent within a requested time range.

Figure 5:
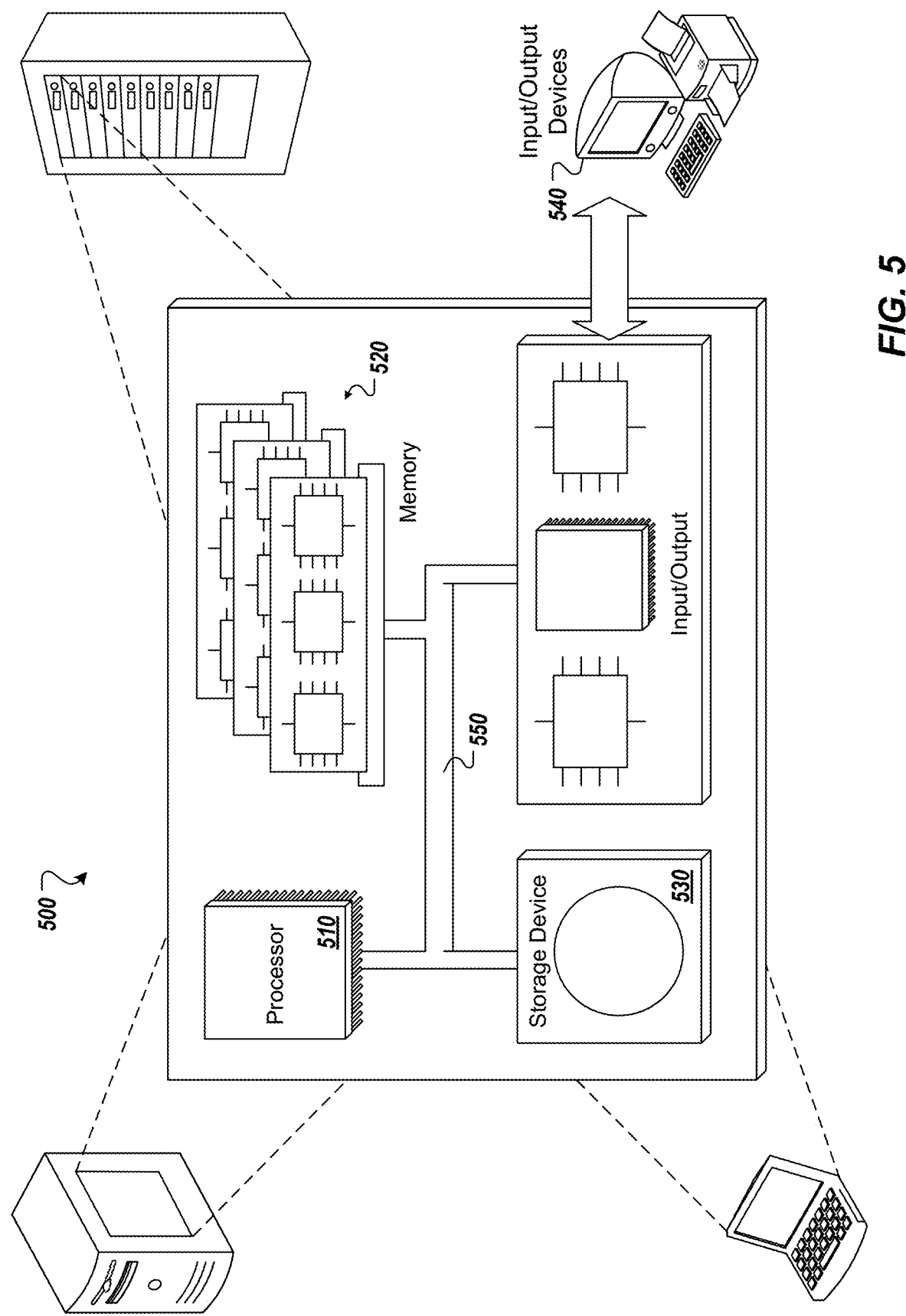
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semi-conductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing data for time series visualizations based on stored machine-sensor data, the method being executed by one or more processors and comprising:

receiving, by the one or more processors, a query that is coded into a computer-executed application that queries a database system, the query comprising a first portion that defines a number of data groups (N) that data is to be divided into, and a second portion that removes redundant values from a data group, if any, the first portion comprising a SELECT DISTINCT Timestamp argument and the second portion comprising a SELECT DISTINCT MAX (Timestamp) argument, the query being absent a round function;

processing, by the one or more processors, and within the database system, the query to perform a plurality of computations within the database system, to produce an initial result set comprising N+1 data groups, and to produce a result set comprising N data groups by moving data from a N+1$^{th}$ data group into a N$^{th}$ data group, each data group having a minimum value and associated timestamp, and a maximum value and associated timestamp; and transmitting, by the one or more processors, the result set to the application to provide one or more time series visualizations for display in a user interface.

2. The method of claim 1, wherein the first portion comprises a floor function and a least function, which are processed to provide the number of data groups.

3. The method of claim 1, wherein the second portion removes a redundant value having an earlier timestamp from a data group relative to a redundant value having a later timestamp.

4. The method of claim 1, wherein the query is processed based on a plurality of user-defined attributes comprising the number of data groups, and a timestamp range defined based on a first timestamp and a second timestamp.

5. The method of claim 1, wherein the query comprises a third portion that selectively includes a specified non-numeric value in the result set, in response to determining that the result set would otherwise not include the specified non-numeric value.

6. The method of claim 1, wherein the query comprises a third portion including interpolation to provide data in the result set when no data exists in a requested time range.

7. The method of claim 1, wherein the data comprises machine-sensor data provided from one or more Internet-of-Things (IoT) devices.

8. A non-transitory computer-readable storage medium coupled to one or more processors and having instructions stored thereon which, when executed by the one or more processors, cause the one or more processors to perform operations for providing data for time series visualizations based on stored machine-sensor data, the operations comprising:

receiving a query that is coded into a computer-executed application that queries a database system, the query comprising a first portion that defines a number of data groups (N) that data is to be divided into, and a second portion that removes redundant values from a data group, if any, the first portion comprising a SELECT DISTINCT Timestamp argument and the second portion comprising a SELECT DISTINCT MAX (Timestamp) argument, the query being absent a round function;

processing, within the database system, the query to perform a plurality of computations within the database system, to produce an initial result set comprising N+1 data groups, and to produce a result set comprising N data groups by moving data from a N+1$^{th}$ data group into a N$^{th}$ data group, each data group having a minimum value and associated timestamp, and a maximum value and associated timestamp; and transmitting, by the one or more processors, the result set to the application to provide one or more time series visualizations for display in a user interface.

9. The computer-readable storage medium of claim 8, wherein the first portion comprises a floor function and a least function, which are processed to provide the number of data groups.

10. The computer-readable storage medium of claim 8, wherein the second portion removes a redundant value having an earlier timestamp from a data group relative to a redundant value having a later timestamp.

11. The computer-readable storage medium of claim 8, wherein the query is processed based on a plurality of user-defined attributes comprising the number of data groups, and a timestamp range defined based on a first timestamp and a second timestamp.

12. The computer-readable storage medium of claim 8, wherein the query comprises a third portion that selectively includes a specified non-numeric value in the result set, in response to determining that the result set would otherwise not include the specified non-numeric value.

13. The computer-readable storage medium of claim 8, wherein the query comprises a third portion including interpolation to provide data in the result set when no data exists in a requested time range.

14. The computer-readable storage medium of claim 8, wherein the data comprises machine-sensor data provided from one or more Internet-of-Things (IoT) devices.

15. A system, comprising:
a computing device; and
a computer-readable storage device coupled to the computing device and having instructions stored thereon which, when executed by the computing device, cause the computing device to perform operations for providing data for time series visualizations based on stored machine-sensor data, the operations comprising:
receiving a query that is coded into a computer-executed application that queries a database system, the query comprising a first portion that defines a number of data groups (N) that data is to be divided into, and a second portion that removes redundant values from a data group, if any, the first portion comprising a SELECT DISTINCT Timestamp argument and the second portion comprising a SELECT DISTINCT MAX (Timestamp) argument, the query being absent a round function;
processing, within the database system, the query to perform a plurality of computations within the database system, to produce an initial result set comprising N+1 data groups, and to produce a result set comprising N data groups by moving data from a $N+1^{th}$ data group into a $N^{th}$ data group, each data group having a minimum value and associated timestamp, and a maximum value and associated timestamp; and
transmitting, by the one or more processors, the result set to the application to provide one or more time series visualizations for display in a user interface.

16. The system of claim 15, wherein the first portion comprises a floor function and a least function, which are processed to provide the number of data groups.

17. The system of claim 15, wherein the second portion removes a redundant value having an earlier timestamp from a data group relative to a redundant value having a later timestamp.

18. The system of claim 15, wherein the query is processed based on a plurality of user-defined attributes comprising the number of data groups, and a timestamp range defined based on a first timestamp and a second timestamp.

19. The system of claim 15, wherein the query comprises a third portion that selectively includes a specified non-numeric value in the result set, in response to determining that the result set would otherwise not include the specified non-numeric value.

20. The system of claim 15, wherein the query comprises a third portion including interpolation to provide data in the result set when no data exists in a requested time range.

* * * * *